(12) United States Patent
Bae et al.

(10) Patent No.: US 8,549,164 B2
(45) Date of Patent: Oct. 1, 2013

(54) MEDIA TRANSMISSION SYSTEM AND METHOD

(75) Inventors: Tae Meon Bae, Daegu (KR); Kyung Min Kim, Seoul (KR)

(73) Assignee: SK Planet Co., Ltd. (KR)

( * ) Notice: Subject to any disclaimer, the term of this patent is extended or adjusted under 35 U.S.C. 154(b) by 402 days.

(21) Appl. No.: 12/737,959

(22) PCT Filed: Jun. 15, 2009

(86) PCT No.: PCT/KR2009/003191
§ 371 (c)(1),
(2), (4) Date: Mar. 3, 2011

(87) PCT Pub. No.: WO2010/027143
PCT Pub. Date: Mar. 11, 2010

(65) Prior Publication Data
US 2011/0153858 A1   Jun. 23, 2011

(30) Foreign Application Priority Data

Sep. 4, 2008 (KR) .......................... 10-2008-0087054

(51) Int. Cl.
*G06F 15/16* (2006.01)
(52) U.S. Cl.
USPC ......................................... 709/231; 709/219
(58) Field of Classification Search
USPC ................................................ 709/219, 231
See application file for complete search history.

(56) References Cited

U.S. PATENT DOCUMENTS

| | | | | |
|---|---|---|---|---|
| 2001/0055470 | A1* | 12/2001 | Yoshimoto et al. | 386/68 |
| 2003/0128967 | A1* | 7/2003 | Ito et al. | 386/68 |
| 2005/0071491 | A1 | 3/2005 | Seo | |
| 2005/0238316 | A1 | 10/2005 | MacDonald Boyce et al. | |
| 2007/0073847 | A1* | 3/2007 | Lee | 709/219 |

FOREIGN PATENT DOCUMENTS

| | | |
|---|---|---|
| CN | 1558665 | 12/2004 |
| CN | 1941900 | 4/2007 |
| CN | 101009578 | 8/2007 |
| JP | 2007-037173 | 2/2007 |
| KR | 10-2004-0047095 | 6/2004 |
| KR | 10-2006-0124368 | 12/2006 |
| KR | 10-2007-0011811 | 1/2007 |
| KR | 10-2008-0014362 | 2/2008 |
| WO | 03/048974 | 6/2003 |

\* cited by examiner

*Primary Examiner* — Wing F Chan
*Assistant Examiner* — David X Yi
(74) *Attorney, Agent, or Firm* — Baker & Hostetler LLP

(57) ABSTRACT

A media transmission system and method having a server for selecting a video frame having an image number nearest to play position information and a high compression ratio, and for transmitting the video frame to a user terminal when the user terminal transmits desired play position information to the server while media data streaming is being performed from the server to the user terminal, thereby moving to the scene desired by a user and playing the scene in a simple manner with the media transmission system comprising a user terminal for receiving, from a user, desired position information for the media data being streamed and played, receiving the video stream matched to the position information for playing the video stream; and a media server for searching for the video stream having a high compression ratio among the video streams nearest to the position information, and streaming the searched video stream to the user terminal when the position information is received from the user terminal after streaming media data to the user terminal.

19 Claims, 6 Drawing Sheets

MEDIA TRANSMISSION SYSTEM AND METHOD

TECHNICAL FIELD

The present invention relates to a media transmission system and method and, more particularly, to a media transmission system and method, wherein if a user terminal transmits information about a position where media data will be played to a server when the media data is streamed from the server to the user terminal, the server selects an video frame, having an image number nearest to the information of the play position and having a high compression ratio, to the user terminal so that a user can easily move to a desired scene and play the desired scene.

BACKGROUND ART

In general, a digital video signal is compressed and encoded according to a specific method because it has a very high capacity of data and then transmitted or is recorded on a recording medium. A Moving Picture Experts Group (MPEG) method has recently been known as the standard method of a compression and encoding system. In the MPEG method, a digital video signal is compressed and encoded using a Discrete Cosine Transform (DCT) and motion compensation. Furthermore, the compression ratio of data is increased by using variable length encoding.

A data structure in the MPEG method consists of a block layer, a macro block layer, a slice layer, a picture layer, a GOP layer, and a sequence layer in the sequence from a lower layer to an upper layer. The block layer is composed of a DCT block that is a unit for performing DCT processing. The macro block layer consists of a plurality of DCT blocks. The slice layer consists of a header part and one or more macro blocks. The picture layer consists of a header part and one or more slices. One picture corresponds to one screen.

The GOP layer consists of an Intra-coded (I) picture based on a header part and intra-frame encoding, Predictive-coded (P) pictures based on predictive encoding, and Bi-directionally predictive coded (B) pictures. The I picture can be decoded by only its own information. The P and B pictures are a reference picture. The P and B pictures require previous or subsequent pictures, and they are not solely decoded. For example, the P picture may be decoded using an I picture or a P picture, temporally earlier than itself, as a reference picture. Furthermore, the B picture is decoded by using two sheets of I pictures or P pictures before and after the B picture as a reference picture. A group, configured to include a sheet of the I picture and completed in itself, is called a Group Of Picture (GOP). The GOP becomes a minimum unit that is accessible in the streams of MPEG.

When the above compression image is streamed from a server to a terminal, a viewer who watches the image through the terminal moves to a desired scene using a fast forward or rewind function and watches the desired scene.

In order to satisfy the need of the viewer, in a conventional streaming method, the position of an I frame (or an IDR frame-H.264 reference) is recorded on the server, and transmission is performed starting with an I frame (or an IDR frame) nearest to a play position requested by the user.

The I frame (or IDR frame), however, is disadvantageous in that it has low compression efficiency if a larger number of the I frames or the IDR frames are put into a video stream at the time of encoding for the purpose of random access because it has low compression efficiency.

DISCLOSURE

Technical Problem

The present invention has been made to solve the above problems, and an object of the present invention is to provide a media transmission system and method, wherein if a user terminal transmits information about a position where media data will be played to a server when the media data is streamed from the server to the user terminal, the server selects an video frame, having an image number nearest to the information of the play position and having a high compression ratio, to the user terminal so that a user can easily move to a desired scene and play the desired scene.

The present invention has been made to solve the above problems, and another object of the present invention is to provide a media server and a media streaming method of the media server, wherein when a random access point corresponding to play position information is received from a user terminal, a video stream, having an image number nearest to the random access point and a high compression ratio, to the user terminal and a frame, having an image number nearest to the random access point in a next video stream, to the user terminal.

Furthermore, yet another object of the present invention is to provide a user terminal and a media streaming method of the user terminal, wherein after a random access point corresponding to play position information received from a user is transmitted to a media server, a video stream corresponding to the random access point is received from the media server in a streaming form and then played.

Technical Solution

To achieve the above objects, a media transmission system according to the present invention includes a user terminal for receiving position information about a position where play is requested from a user, in relation to media data received in a streaming form and being played, transmitting the position information, receiving an image stream corresponding to the position information in a streaming form, and playing the received image stream; and a media server for, when the position information is received from the user terminal after streaming the media data to the user terminal, searching for an image stream having a high compression ration, from among image streams nearest to the position information, and streaming the retrieved image stream to the user terminal.

Furthermore, the user terminal transmits a random access point, indicating the time when play corresponding to the play position information is requested, to the media server.

Furthermore, the image stream has a shorter GOP cycle according to a smaller stream number and has a longer GOP cycle according to a greater stream number.

Furthermore, if there are one or more image streams in each of which an I frame (or an IDR frame) is a $P^{th}$ frame, the media server selects an image stream, having a high compression ration owing to a long GOP cycle and having a great stream number, and transmits the selected image stream to the user terminal.

Meanwhile, to achieve the above objects, a media server according to the present invention comprises a communication unit for communicating with a user terminal; a media transmission unit for transmitting media content to the user terminal in a streaming form through the communication unit; a content storage unit for dividing the media content into a plurality of video streams, having respective stream numbers, and storing the video streams; a stream determination unit for determining a video stream to be transmitted based on play position information received from the user terminal; a stream switch unit for selecting the video stream to be transmitted, from the content storage unit, based on information determined by the stream determination unit; and a control unit for, while the media content is streamed to the user terminal, selecting a video stream nearest to the play position information based on the play position information received from the user terminal and controlling the selected video stream so that the selected video stream is transmitted to the user terminal.

Furthermore, the content storage unit stores the video streams having the respective stream numbers assigned thereto in the sequence of a shorter GOP cycle.

Furthermore, the content storage unit stores the video streams, having a shorter GOP cycle according to a smaller stream number and a longer GOP cycle according to a greater stream number.

Furthermore, if the play position information is a time t, the control unit searches for a video stream having an I frame (or an IDR frame) nearest to the time t. If the I frame (or the IDR frame) is a $P^{th}$ frame, the control unit transmits frames to the user terminal starting with the $P^{th}$ frame.

Furthermore, if the play position information is the time t, the control unit searches an $N^{th}$ video stream for an I frame (or an IDR frame) nearest to the time t. If the I frame (or the IDR frame) is a $P^{th}$ frame, the control unit transmits frames to the user terminal starting with the $P^{th}$ frame of the $N^{th}$ video stream.

Furthermore, after transmitting the $N^{th}$ video stream, the control unit searches an $(N+1)^{th}$ video stream for a next I frame (or an IDR frame) nearest to the time t. If the next I frame (or the IDR frame) is a $q^{th}$ frame, the control unit transmits frames to the user terminal starting with the $q^{th}$ frame of the $(N+1)^{th}$ video stream.

Furthermore, after transmitting the $(N+1)^{th}$ video stream, the control unit searches an $(N+2)^{th}$ video stream for a next I frame (or an IDR frame) nearest to the time t. If the next I frame. (or the IDR frame) is an $r^{th}$ frame, the control unit transmits frames to the user terminal starting with the $r^{th}$ frame of the $(N+2)^{th}$ video stream.

Meanwhile, to achieve the above objects, a user terminal according to the present invention comprises a communication unit for communicating with a media server; a media play unit for playing media data streamed from the media server through the communication unit; a display unit for displaying the media data, being played by the media play unit, on a screen; an input unit for receiving play position information about a position where play is requested from a user, in relation to the media data being played by the media play unit; and a control unit for controlling the media data streamed from the media server so that the media data is played, transmitting the play position information, received through the input unit, to the media server, and controlling video stream so that the video streams are streamed from the media server, starting with a video stream corresponding to the play position information, and then played.

Here, when the play position information is received from the input unit, the control unit transmits a random access point, indicating the time corresponding to the play position information, to the media server through the communication unit.

Meanwhile, to achieve the above objects, a media streaming method according to the present invention is a media streaming method of a system, comprising a media server for streaming media data to a user terminal over a communication network. The media streaming method comprises the steps of (a) the media server streaming the media data to the user terminal; (b) the user terminal playing the streamed media data; (c) the user terminal transmitting play position information about a position where play is requested to the media server; (d) the media server searching for a video stream corresponding to the play position information; and (e) the media server streaming video streams to the user terminal, starting with the video stream corresponding to the play position information.

Furthermore, the step (c) comprises the user terminal transmitting a random access point, indicating a desired play time corresponding to the play position information received from a user, to the media server.

Furthermore, in the step (e), the video stream has a shorter GOP cycle according to a smaller stream number and has a longer GOP cycle according to a greater stream number.

Furthermore, the step (e) comprises the media server selecting a video stream, having a high compression ratio owing to a long GOP cycle and a great stream number, from among the video streams corresponding to the play position information and transmitting the selected video stream to the user terminal.

Meanwhile, to achieve the above objects, a media streaming method according to the present invention is a media streaming method of a media server for storing a piece of media content in a form of a plurality of video streams. The media streaming method comprises the steps of (a) streaming the media content to a user terminal; (b) receiving play position information about a position where play is requested from the user terminal; (c) determining a video stream corresponding to the play position information, from among the plurality of video streams; and (d) streaming video streams to the user terminal, starting with the video stream corresponding to the play position information.

Furthermore, the step (b) comprises receiving a random access point, indicating a time corresponding to the play position information, from the user terminal.

Furthermore, if the play position information is a time t in the step (b), the step (c) comprises searching for a video stream having an I frame (or an IDR frame) nearest to the time t and, if the I frame (or the IDR frame) is a $P^{th}$ frame of the retrieved video stream, determining the $P^{th}$ frame of the video stream as the video stream corresponding to the play position information.

Furthermore, if the play position information is a time t and the time t is included in an $N^{th}$ video stream, the step (c) comprises searching the $N^{th}$ video stream for an I frame (or an IDR frame) nearest to the time t and, if the retrieved I frame (or the IDR frame) is a $P^{th}$ frame, determining the $P^{th}$ frame of the $N^{th}$ video stream as the video stream corresponding to the play position information, and the step (d) comprises transmitting frames of one GOP to the user terminal starting with the $P^{th}$ frame of the $N^{th}$ video stream.

Furthermore, after the step (d) of transmitting the $N^{th}$ video stream, the step (c) is performed again in order to search an $(N+1)^{th}$ video stream for a next I frame (or an IDR frame) nearest to the time t and, if the next I frame (or the IDR frame) is a $q^{th}$ frame, to determine the $q^{th}$ frame of the $(N+1)^{th}$ video stream as the video stream corresponding to the play position information, and the step (d) comprises transmitting frames of one GOP to the user terminal starting with the $q^{th}$ frame of the $(N+1)^{th}$ video stream.

Furthermore, after the step (d) of transmitting the $(N+1)^{th}$ video stream, the step (c) is performed again in order to search an $(N+2)^{th}$ video stream for a next I frame (or an IDR frame) nearest to the time t and, if the next I frame (or the IDR frame) is an $r^{th}$ frame, to determine the $r^{th}$ frame of the $(N+2)^{th}$ video stream as the video stream corresponding to the play position information, and the step (d) comprises transmitting frames of one GOP to the user terminal starting with the $r^{th}$ frame of the $(N+2)^{th}$ video stream.

Meanwhile, to achieve the above objects, a media streaming method according to the present invention is a media streaming method of a user terminal communicating with a media server for storing a piece of media content in a form of a plurality of video streams over a communication network. The media streaming method comprises the steps of (a) receiving the media content from the media server in a streaming form; (b) playing the streamed media content; (c) receiving play position information about a position where play is requested from a user in relation to the played media content; (d) transmitting the received play position information to the media server; (e) receiving a video stream, corresponding to the play position information, from the media server in a streaming form; and (f) playing video streams, starting with the video stream corresponding to the play position information.

Furthermore, if the play position information is a random access point where play is requested at a time t in the step (d), the video stream corresponding to the play position information in the step (e) is a video stream having an I frame (or an IDR frame) nearest to the time t. If the I frame (or the IDR frame) is a $P^{th}$ frame, the step (f) comprises playing frames starting with the $P^{th}$ frame of the video stream.

Furthermore, the video stream in which the I frame (or the IDR frame) is the $P^{th}$ frame is a video stream having a greatest stream number, from among the plurality of video streams for the piece of media content stored in the media server.

Furthermore, the video stream having the greatest stream number is a video stream having a high compression ratio owing to a long GOP cycle.

Meanwhile, the media streaming method of the media server according to the present invention can be recorded on a computer-readable medium in the form of a program. Furthermore, the media streaming method of the user terminal according to the present invention can be recorded on a computer-readable medium in the form of a program.

Advantageous Effects

According to the present invention, a larger number of random access points can be provided to a user so that the user can select and watch a desired scene while watching a moving image. Furthermore, since a large number of random access points can be provided, the degradation of the compression ratio can be prevented. In addition, a user can easily move to and watch a desired scene while watching media content.

BEST MODE

Figure 1:
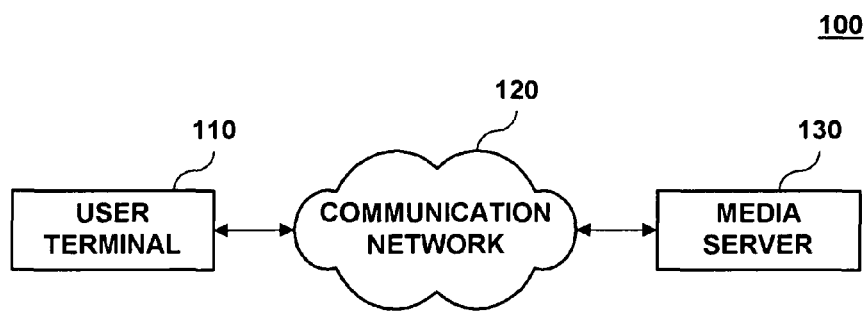
FIG. 1 is a configuration schematically showing the construction of a media transmission system according to an embodiment of the present invention.

FIG. 1 is a configuration schematically showing the construction of a media transmission system according to an embodiment of the present invention.

Referring to FIG. 1, the media transmission system according to the present invention includes a user terminal 110, a communication network 120, and a media server 130.

The user terminal 110 receives play position information about a position where play is requested from a user, in relation to media data received from the media server 130 in a streaming form and being played, transmits the play position information to the media server 130, receives video streams in a streaming form, starting with a video stream corresponding to the play position information, from the media server 130, and plays the video streams.

Here, the user terminal 110 transmits a random access point, indicating the time when play is required, to the media server 130.

The communication network 120 provides a transmission path so that the media server 130 can stream media content to the user terminal 110 and also provides an access path for enabling the user terminal 110 to access the media server 130. In this case, the communication network 120 may be a wireless network, such as a mobile communication network or a near-field communication network, or a wired network such as the Internet.

If play position information is received from the user terminal 130 after the media content is streamed to the user terminal 110, the media server 130 searches for a video stream nearest to the play position information and streams the retrieved video stream to the user terminal 110.

Furthermore, in the case where the play position information received from the user terminal 110 is a random access point where play is requested starting with a time t, the media server 130 searches for a video stream having an I frame nearest to the time t. If the I frame (or an IDR frame) is a $P^{th}$ frame, the media server 130 transmits frames to the user terminal 110 starting with the $P^{th}$ frame of the video stream.

Furthermore, in the case where there are one or more video streams in each of which the I frame (or the IDR frame) is the $P^{th}$ frame, the media server 130 selects a video stream having the greatest stream number, from among the one or more video streams, and transmits the selected video stream to the user terminal 110. Here, the video stream has a shorter GOP cycle according to a smaller stream number and a longer GOP cycle according to a greater stream number.

Furthermore, in the case where there are one or more video streams in each of which the I frame (or the IDR frame) is the $P^{th}$ frame, the media server 130 selects a video stream having a high compression ratio owing to a long GOP cycle and having a great stream number, from among the one or more video streams, and transmits the selected video frame to the user terminal 110.

MODE FOR INVENTION

Figure 2:
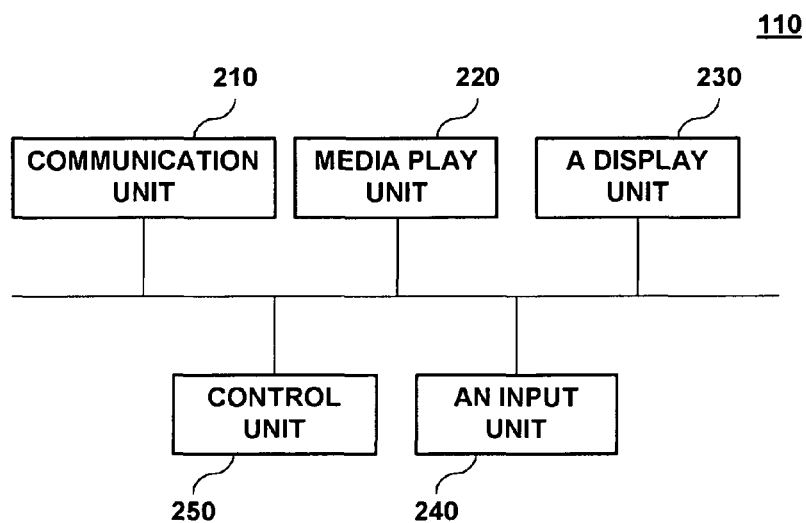
FIG. 2 is a configuration schematically showing the construction of a user terminal according to an embodiment of the present invention.

FIG. 2 is a configuration schematically showing the construction of the user terminal according to an embodiment of the present invention.

Referring to FIG. 2, the user terminal 110 according to the present invention includes a communication unit 210, a media play unit 220, a display unit 230, an input unit 240, and a control unit 250.

The communication unit 210 communicates with the media server 130 over the communication network.

The media play unit 220 plays media content received from the media server 130 in a streaming form.

The display unit 230 displays the media content, played by the media play unit 220, on a screen.

The input unit 240 receives play position information about a position where play is requested from a user, in relation to the media content being played by the media play unit 220.

The control unit 250 controls the media content received from the media server 130 in a streaming form so that the media content is played. Furthermore, the control unit 250 transmits play position information, received through the input unit 240, to the media server 130 so that video streams are streamed from the media server 130, starting with a video stream corresponding to the play position information, and then played.

Here, the play position information received through the input unit 240 is a random access point indicating the time when play is requested.

Figure 3:
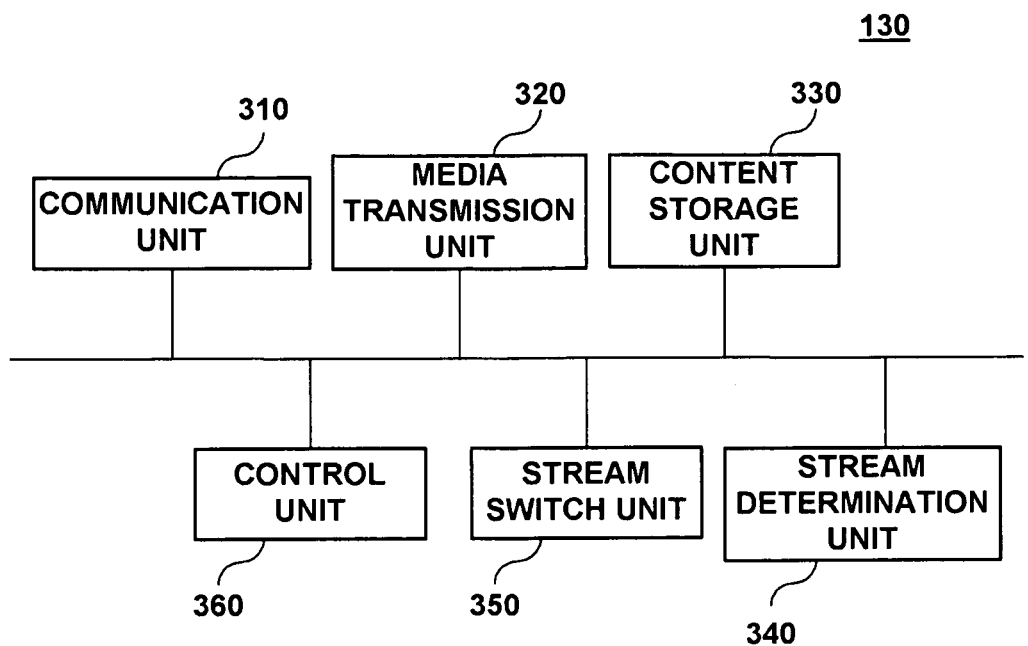
FIG. 3 is a configuration schematically showing the construction of a media server according to an embodiment of the present invention.

FIG. 3 is a configuration schematically showing the construction of a media server according to an embodiment of the present invention.

Referring to FIG. 3, the media server 130 according to the present invention includes a communication unit 310, a media transmission unit 320, a content storage unit 330, a stream determination unit 340, a stream switch unit 350, and a control unit 360.

The communication unit 310 communicates with the user terminal 110 over the communication network 120.

The media transmission unit 320 transmits media content to the user terminal 110 through the communication unit 210 in the form of stream.

The content storage unit 330 divides a piece of media content into a plurality of video streams having respective stream numbers and stores the video streams.

Furthermore, the content storage unit 330 stores video streams having respective stream numbers assigned thereto in the sequence of a shorter GOP cycle.

Furthermore, the content storage unit 330 stores video streams, each having a shorter GOP cycle with the stream number becoming smaller and having a longer GOP cycle with the stream number becoming greater.

The stream determination unit 340 determines a video stream on the basis of play position information received from the user terminal 110. Here, the play position information is a random access point indicating the time when play is requested.

The stream switch unit 350 selects a video stream to be transmitted, from the content storage unit 330, on the basis of information determined by the stream determination unit 340.

The control unit 360 selects a video stream nearest to play position information received from the user terminal 110 on the basis of the play position information, while media content is streamed to the user terminal 110, and performs control so that the selected video stream is transmitted to the user terminal 110.

Furthermore, in the case where play position information is a time t, the control unit 360 searches for a video stream having an I frame (or an IDR frame) nearest to the time t. If the I frame (or IDR frame) of the retrieved video stream is a $P^{th}$ frame, the control unit 360 transmits frames to the user terminal 110 starting with the $P^{th}$ frame of the video stream.

Furthermore, in the case where the play position information is the time t, the control unit 360 searches an $N^{th}$ video stream for an I frame (or an IDR frame) nearest to the time t. If the I frame (or IDR frame) of the $N^{th}$ video stream is a $P^{th}$ frame, the control unit 360 transmits the frames of one GOP to the user terminal 110 starting with the $P^{th}$ frame of the $N^{th}$ video stream.

Furthermore, after transmitting the $N^{th}$ video stream, the control unit 360 searches an $(N+1)^{th}$ video stream for a next I frame (or an IDR frame) nearest to the time t. If the next I frame (or an IDR frame) of the retrieved $(N+1)^{th}$ video stream is a $q^{th}$ frame, the control unit 360 transmits the frames of one GOP to the user terminal 110 starting with the $q^{th}$ frame of the $(N+1)^{th}$ video stream.

Furthermore, after transmitting the $(N+1)^{th}$ video stream, the control unit 360 searches an $(N+2)^{th}$ video stream for a next I frame (or an IDR frame) nearest to the time t. If the next I frame (or an IDR frame) of the retrieved $(N+2)^{th}$ video stream is an $r^{th}$ frame, the control unit 360 transmits the frames of one GOP to the user terminal 110 starting with the $r^{th}$ frame of the $(N+2)^{th}$ video stream.

Figure 4:
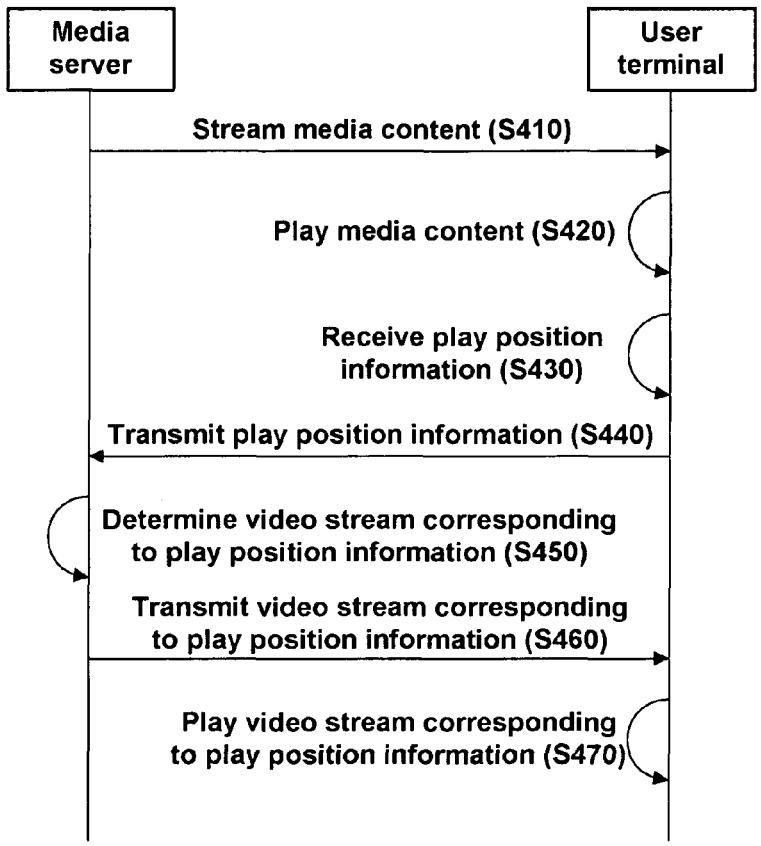
FIG. 4 is a flowchart illustrating a media streaming method according to an embodiment of the present invention.

FIG. 4 is a flowchart illustrating a media streaming method according to an embodiment of the present invention.

Referring to FIG. 4, when the user terminal 110 accesses the media server 130 over the communication network 120, the media server 130 streams media content to the accessed user terminal 110 at step S410.

Figure 5:
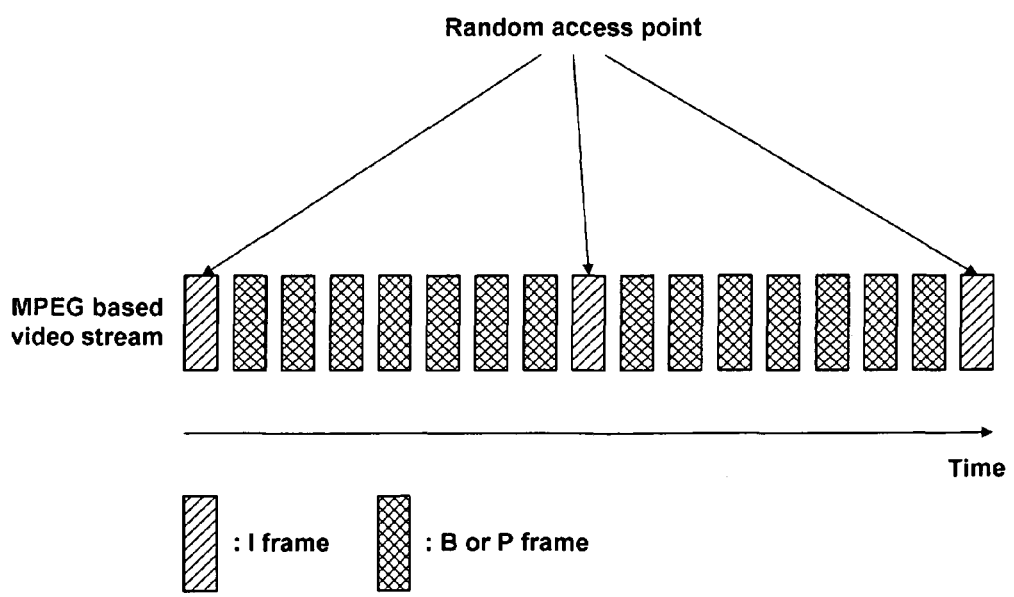
FIG. 5 is a diagram illustrating the configuration of common MPEG-based media content.

Here, the media content streamed from the media server 130 to the user terminal 110 has a configuration, such as that shown in FIG. 5. FIG. 5 is a diagram illustrating the configuration of common MPEG-based media content. As shown in FIG. 5, in the MPEG-based media content, I frames are disposed at specific intervals, and the I frame becomes a random access point. In this case, it is advantageous that the ratio of the I frames in the entire frames is low in terms of the compression efficiency because the I frame has very lower compression ratio than a P frame or a B frame using motion prediction. The I frame, is periodically inserted as shown in FIG. 5, and the cycle of the I frame is called a GOP. With the GOP cycle becoming longer, the compression efficiency becomes high, but the random access interval becomes long.

The user terminal 110 plays the media content, streamed from the media server 130, through the media play unit 220 and displays the media content through the display unit 230 in the form of video at step S420.

Next, the user terminal 110 receives play position information about a position where play is requested from a user through the input unit 240 at step S430.

The user terminal 110 transmits the play position information, received through the input unit 240, to the media server 130 through the communication unit 210 at step S440.

Here, the play position information is a random access point indicating the time of a scene whose play is requested by the user.

The media server 130 which has received the play position information from the user terminal 110 searches for a video stream corresponding to the play position information and determines media content to be transmitted to the user terminal 110 based on the retrieved video frame at step S450.

For example, in the case where the play position information is a time t, the media server 130 searches the content storage unit 330, having a piece of media content stored therein in the form of a plurality of video streams, for a video stream having an I frame (or an IDR frame) nearest to the time t. If the I frame (or IDR frame) of the retrieved video stream is a $P^{th}$ frame, the media server 130 determines the $P^{th}$ frame as the video stream corresponding to the play position information.

Next, the media server 130 streams video streams to the user terminal 110 in unit of GOP, starting with the video stream corresponding to the play position information at step S460.

Figure 6:
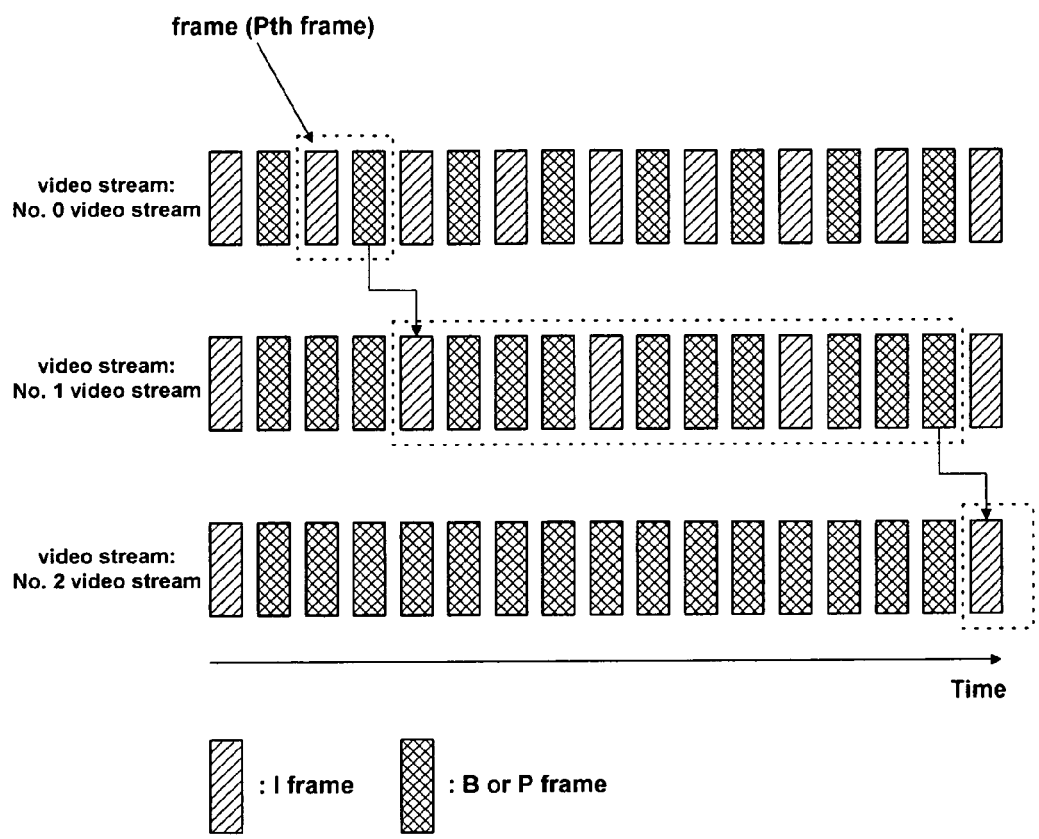
FIG. 6 is a diagram illustrating a process of transmitting video streams corresponding to play position information requested by a user according to an embodiment of the present invention.

For example, in the case where the $P^{th}$ frame of a No. 0 video stream is an I frame (or an IDR frame) nearest to a time t (that is, play position information) as shown in FIG. 6, the media server 130 determines the $P^{th}$ frame of the No. 0 video stream as a video stream corresponding to the play position information and streams frames to the user terminal 110 in unit of GOP starting with the $P^{th}$ frame of the No. 0 video stream. FIG. 6 is a diagram illustrating a process of transmitting a video stream corresponding to play position information requested by a user according to an embodiment of the present invention.

In other words, in the case where play position information is a time t and the time t is included in an $N^{th}$ video stream, the media server 130 searches the $N^{th}$ video stream for an I frame (or an IDR frame) nearest to the time t. If the retrieved I frame (or IDR frame) is a $P^{th}$ frame, the media server 130 determines the $P^{th}$ frame of the $N^{th}$ video stream as a video stream, corresponding to the play position information, and transmits the frames of one GOP to the user terminal 110 starting with the $P^{th}$ frame of the $N^{th}$ video stream.

Next, as shown in FIG. 6, after transmitting the No. 0 video stream, the media server 130 searches a No. 1 video stream for an I frame (or an IDR frame) nearest to the time t (that is, the play position information). If the retrieved I frame is a $q^{th}$ frame, the media server 130 transmits the No. 0 video stream up to the time prior to the $q^{th}$ frame, determines the $q^{th}$ frame of the No. 1 video stream as a video stream corresponding to the play position information, and streams frames to the user terminal 110 in unit of GOP starting with the $q^{th}$ frame of the No. 1 video stream.

In other words, after transmitting an $N^{th}$ video stream, the media server 130 searches an $(N+1)^{th}$ video stream for a next I frame (or an IDR frame) nearest to the time t. If the next I frame (or an IDR frame) is a $q^{th}$ frame, the media server 130 transmits the $N^{th}$ video stream up to the time prior to the $q^{th}$ frame, determines the $q^{th}$ frame of the $(N+1)^{th}$ video stream as a video stream corresponding to the play position information, and transmits the frames of one GOP to the user terminal 110 starting with the $q^{th}$ frame of the $(N+1)^{th}$ video stream.

Furthermore, as shown FIG. 6, after transmitting the No. 1 video stream, the media server 130 searches a No. 2 video stream for an I frame (or an IDR frame) nearest to the time t (that is, the play position information). If the retrieved I frame is an $r^{th}$ frame, the media server 130 determines the $r^{th}$ frame of the No. 2 video stream as a video stream corresponding to the play position information and streams frames to the user terminal 110 in unit of GOP starting with the $r^{th}$ frame of the No. 2 video stream.

In other words, after transmitting an $(N+1)^{th}$ video stream, the media server 130 searches an $(N+2)^{th}$ video stream for a next I frame (or an IDR frame) nearest to the time t. If the next I frame (or an IDR frame) is an $r^{th}$ frame, the media server 130 determines the $r^{th}$ frame of the $(N+2)^{th}$ video stream as a video stream corresponding to the play position information and transmits the frames of one GOP to the user terminal 110 starting with the $r^{th}$ frame of the $(N+2)^{th}$ video stream.

The media server 130 repeatedly performs the above process until a video stream having the greatest stream number is transmitted.

The user terminal 110 receives a video stream, corresponding to the play position information requested by the user, from the media server 130, plays the video stream through the media play unit 220, and displays the video stream through the display unit 230 in the form of video at step S470.

Accordingly, a user can easily watch a moving image that is being watched, starting with a desired scene.

Figure 7:
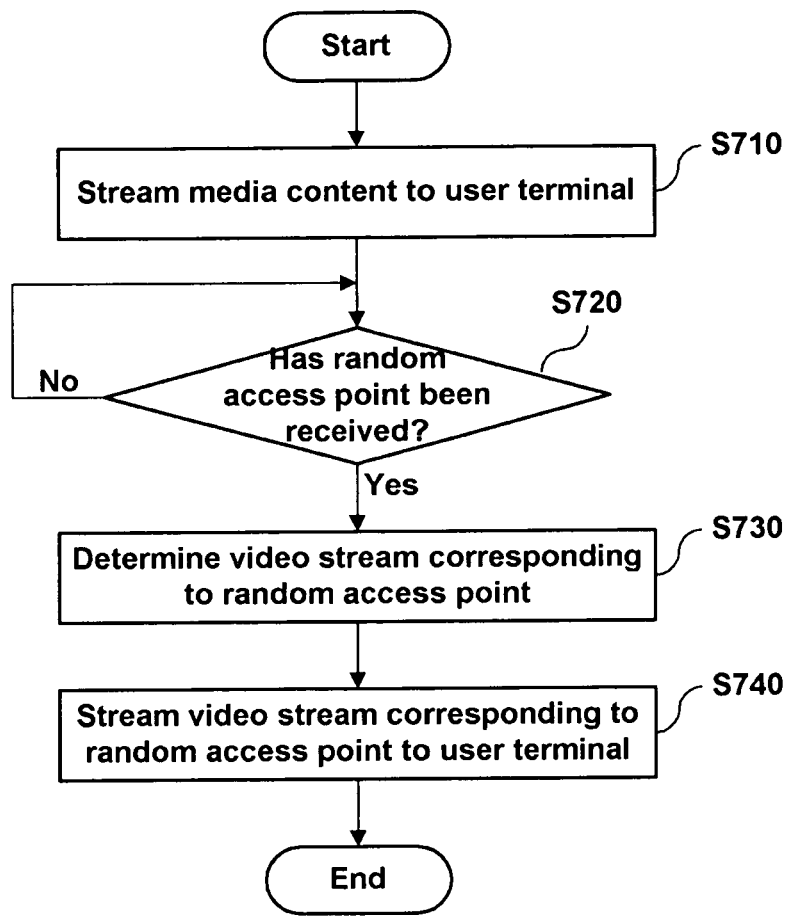
FIG. 7 is an operation flowchart illustrating a media streaming method of the media server according to an embodiment of the present invention.

FIG. 7 is an operation flowchart illustrating a media streaming method of the media server according to an embodiment of the present invention.

Referring to FIG. 7, the media server 130 in which a piece of media content is stored in the form of a plurality of video streams transmits media content, selected by the user terminal 110, to the user terminal 110 in a streaming form at step S710.

Next, the media server 130 receives a random access point where play is required from the user terminal 110 that is streaming the media content at step S720.

When the random access point is received from the user terminal 110, the media server 130 determines a video stream corresponding to the random access point from among the plurality of video streams stored in the content storage unit 330 at step S730.

In other words, the media server 130 determines the video stream corresponding to the random access point through the stream determination unit 340 and selects the video stream, determined by the stream determination unit 340, in the content storage unit 330 through the stream switch unit 350.

Next, the media server 130 streams a No. A video stream, corresponding to the random access point, to the user terminal 110 through the media transmission unit 320 and then continues to perform a process of streaming a video stream, having the greatest stream number and nearest to the random access point, from among video streams greater than the No. A video stream so that the video stream having the greatest stream number (that is, the longest GOP) can be streamed at step S740.

Figure 8:
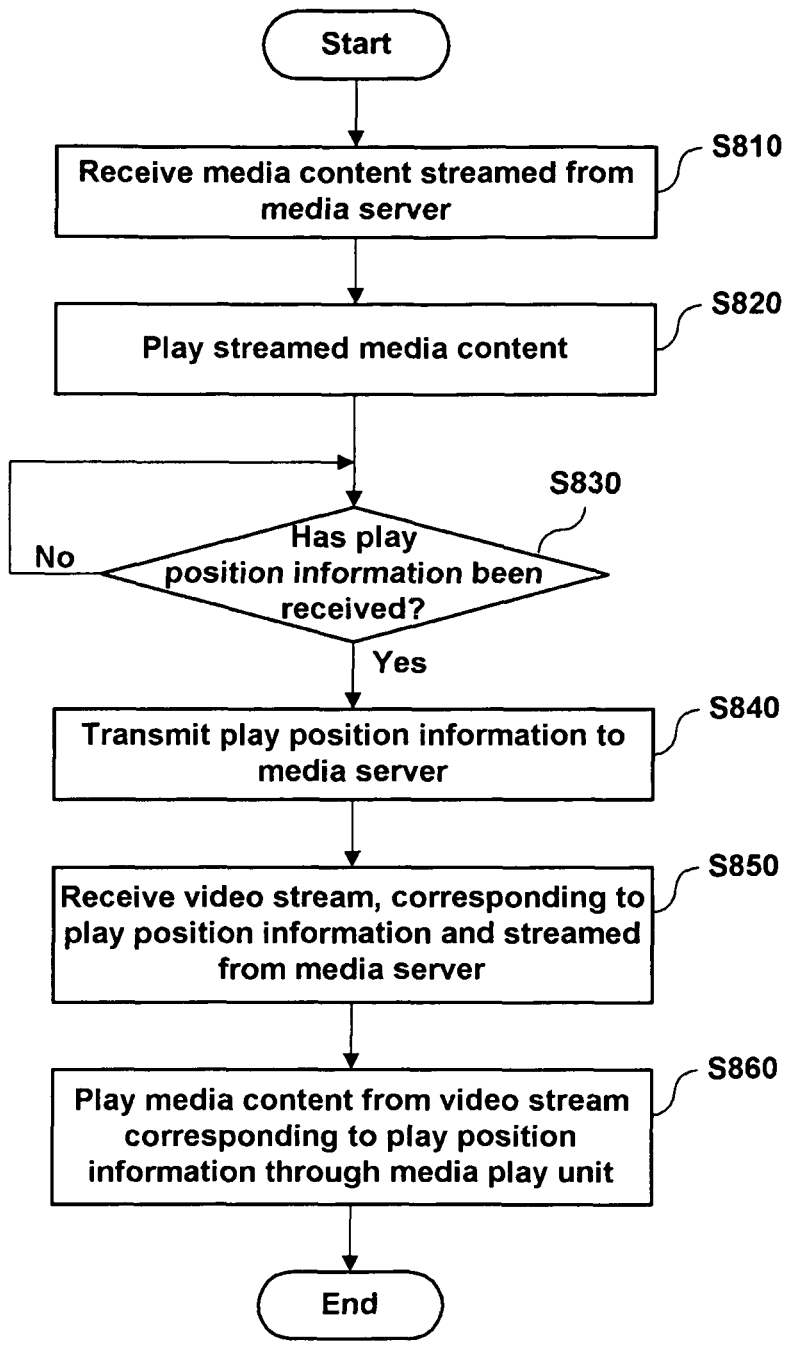
FIG. 8 is an operation flowchart illustrating a media streaming method of the user terminal according to an embodiment of the present invention.

FIG. 8 is an operation flowchart illustrating a media streaming method of the user terminal according to an embodiment of the present invention.

Referring to FIG. 8, the user terminal 110 communicating with the media server 130 over the communication network 120 accesses the media server 130 over the communication network 120 and receives media content selected by a user for watching, from among a number of pieces of media content, from the media server 130 at step S810.

The user terminal 110 plays the media content, being streamed through the communication unit 210, through the media play unit 220 and displays the played media content in the form of video through the display unit 230 at step S820.

Next, the user terminal 110 receives play position information, indicating a scene to be watched by a user, from the user through the input unit 240 at step S830.

In this case, the play position information includes a random access point indicative of the time when the user wants the desired scene to be played.

The user terminal 110 transmits the play position information, received through the input unit 240, to the media server 130 through the communication unit 210 at step S840.

Next, the media server 130 streams a video stream, corresponding to the play position information, to the user terminal 110 at step S850.

Accordingly, the user terminal 110 plays video streams in unit of GOP, starting with the video stream corresponding to the play position information, through the media play unit 220 and displays the video streams in the form of video through the display unit 230 at step S860.

For example, in the case where play position information is a random access point where play is requested at a time t, a video stream corresponding to the play position information may be a video stream having an I frame (or an IDR frame) nearest to the time t, and the I frame (or the IDR frame) may be a $P^{th}$ frame. In this case, the user terminal 110 plays frames in unit of GOP, starting with the $P^{th}$ frame of the video stream having the I frame (or the IDR frame) nearest to the time t.

Here, the video stream in which the I frame (or the IDR frame) is the $P^{th}$ frame may be a video stream having the greatest stream number, from among a plurality of video streams for a piece of media content stored in the media server 130. Furthermore, the video stream having the greatest stream number is a video stream, having a long GOP cycle and a high compression ratio. Video streams having a greater stream number, from among video streams having a greater stream number than a video stream now being transmitted, are transmitted starting with a position where the I frame is placed.

Meanwhile, the media streaming method of the media server according to the present invention may be recorded on a computer-readable medium in the form of a program.

Furthermore, the media streaming method of the user terminal according to the present invention may be recorded on a computer-readable medium in the form of a program.

As described above, according to the present invention, when media data is streamed to the user terminal, if the user terminal transmits play position information about a position where play is requested to the server, the server selects a video frame, having an image number nearest to the play position information and having a high compression ratio, and transmits the selected video frame to the user terminal. Accordingly, the media transmission system and method in which a user can easily move to a desired scene and play the desired scene can be realized.

A person having ordinary skill in the art may implement the present invention in other detailed forms without departing from the technical spirit or indispensable characteristic of the present invention. It will be understood that the above-described embodiments are illustrative and not limitative from all aspects. The scope of the present invention is defined by the appended claims rather than the detailed description. Thus, it will be understood that the present invention should be construed to cover all modifications or variations induced from the meaning and scope of the appended claims and their equivalents.

INDUSTRIAL APPLICABILITY

The present invention may be applied to systems which stream media content, such as a moving image, to a user terminal over a communication network.

Furthermore, the present invention may be applied to media play apparatuses which receive a scene that is requested to be played by a user, from the user when media content streamed from a server is played and have to play media content starting with the requested scene.

Furthermore, the present invention may be applied to wireless communication systems which immediately move a play position to a scene, desired by a user, and stream media content, when a server wirelessly streams the media content to the terminal, thereby being capable of providing the user with media watching convenience.

The invention claimed is:

1. A media server, comprising:
   a communicator for communicating with a user terminal;
   a media transmitter for transmitting media content to the user terminal in a streaming form through the communication unit;
   a content storage for dividing the media content into a plurality of video streams, having respective stream numbers, and storing the video streams;
   a stream determinator for determining a video stream to be transmitted based on play position information received from the user terminal;
   a stream switch for selecting the video stream to be transmitted, from the content storage, based on information determined by the stream determinator; and
   a controller for, while the media content is streamed to the user terminal, selecting a video stream nearest to the play position information based on the play position information received from the user terminal and controlling the selected video stream so that the selected video stream is transmitted to the user terminal;
   wherein if the play position information is the time t, the controller searches an $N^{th}$ video stream for an I frame (or an IDR frame) nearest to the time t and, if the I frame (or the IDR frame) is a $P^{th}$ frame, transmits frames to the user terminal starting with the $P^{th}$ frame of the $N^{th}$ video stream, and
   wherein after transmitting the $N^{th}$ video stream, the controller searches an $(N+1)^{th}$ video stream for a next I frame (or an IDR frame) nearest to the time t and, if the next I frame (or the IDR frame) is a $q^{th}$ frame, transmits frames to the user terminal starting with the $q^{th}$ frame of the $(N+1)^{th}$ video stream.

2. The media server according to claim 1, wherein the content storage stores the video streams having the respective stream numbers assigned thereto in order of a shorter GOP cycle.

3. The media server according to claim 2, wherein the content storage stores the video streams, having a shorter GOP cycle according to a smaller stream number and a longer GOP cycle according to a greater stream number.

4. The media server according to claim 1, wherein if the play position information is a time t, the controller searches for a video stream having an I frame (or an IDR frame) nearest to the time t and, if the I frame (or the IDR frame) is a $P^{th}$ frame, transmits frames to the user terminal starting with the $P^{th}$ frame of the video stream.

5. The media server according to claim 1, wherein after transmitting the $(N+1)^{th}$ video stream, the controller searches an $(N+2)^{th}$ video stream for a next I frame (or an IDR frame) nearest to the time t and, if the next I frame (or the IDR frame) is an $r^{th}$ frame, transmits frames to the user terminal starting with the $r^{th}$ frame of the $(N+2)^{th}$ video stream.

6. A user terminal, comprising:
   a communicator for communicating with a media server;
   a media player for playing media data streamed from the media server through the communicator;
   a display for displaying the media data, being played by the media player, on a screen;
   an input for receiving play position information about a position where play is requested from a user, in relation to the media data being played by the media player; and a controller for controlling the media data streamed from the media server so that the media data is played, transmitting the play position information, received through the input, to the media server, and controlling video streams so that the video streams are streamed from the media server, starting with a video stream corresponding to the play position information, and then played;

wherein if the play position information is the time t, the controller searches an $N^{th}$ video stream for an I frame (or an IDR frame) nearest to the time t and, if the I frame (or the IDR frame) is a $P^{th}$ frame, transmits frames to the user terminal starting with the $P^{th}$ frame of the $N^{th}$ video stream, and wherein after transmitting the $N^{th}$ video stream, the controller searches an $(N+1)^{th}$ video stream for a next I frame (or an IDR frame) nearest to the time t and, if the next I frame (or the IDR frame) is a $q^{th}$ frame, transmits frames to the user terminal starting with the $q^{th}$ frame of the $(N+1)^{th}$ video stream.

7. The user terminal according to claim 6, wherein when the play position information is received from the input, the controller transmits a random access point, indicating a time corresponding to the play position information, to the media server through the communicator.

8. A media streaming method of a system, comprising a media server for streaming media data to a user terminal over a communication network, the media streaming method comprising the steps of:
   (a) the media server streaming the media data to the user terminal;
   (b) the user terminal playing the streamed media data;
   (c) the user terminal transmitting play position information about a position where play is requested to the media server;
   (d) the media server searching for a video stream corresponding to the play position information; and
   (e) the media server streaming video streams to the user terminal, starting with the video stream corresponding to the play position information;
   wherein if the play position information is the time t, the control unit of the media server searches an $N^{th}$ video stream for an I frame (or an IDR frame) nearest to the time t and, if the I frame (or the IDR frame) is a $P^{th}$ frame, transmits frames to the user terminal starting with the $P^{th}$ frame of the $N^{th}$ video stream, and
   wherein after transmitting the $N^{th}$ video stream, the control unit of the media server searches an $(N+1)^{th}$ video stream for a next I frame (or an IDR frame) nearest to the time t and, if the next I frame (or the IDR frame) is a $q^{th}$ frame, transmits frames to the user terminal starting with the $q^{th}$ frame of the $(N+1)^{th}$ video stream.

9. The media streaming method according to claim 8, wherein the step (c) comprises the user terminal transmitting a random access point, indicating a desired play time corresponding to the play position information received from a user, to the media server.

10. The media streaming method according to claim 8, wherein in the step (e), the video stream has a shorter GOP cycle according to a smaller stream number and has a longer GOP cycle according to a greater stream number.

11. The media streaming method according to claim 8, wherein the step (e) comprises the media server selecting a video stream, having a high compression ratio owing to a long GOP cycle and a great stream number, from among the video streams corresponding to the play position information and transmitting the selected video stream to the user terminal.

12. A media streaming method of a media server for storing a piece of media content in a form of a plurality of video streams, the media streaming method comprising the steps of:
   (a) streaming the media content to a user terminal;
   (b) receiving play position information about a position where play is requested from the user terminal;
   (c) determining a video stream corresponding to the play position information, from among the plurality of video streams; and
   (d) streaming video streams to the user terminal, starting with the video stream corresponding to the play position information;
   wherein if the play position information is a time t and the time t is included in an $N^{th}$ video stream,
   the step (c) comprises searching the $N^{th}$ video stream for an I frame (or an IDR frame) nearest to the time t and, if the retrieved I frame (or the IDR frame) is a $P^{th}$ frame, determining the $P^{th}$ frame of the $N^{th}$ video stream as the video stream corresponding to the play position information, and
   the step (d) comprises transmitting frames of one GOP to the user terminal starting with the $P^{th}$ frame of the $N^{th}$ video stream, and
   after the step (d) of transmitting the $N^{th}$ video stream, the step (c) is performed again in order to search an $(N+1)^{th}$ video stream for a next I frame (or an IDR frame) nearest to the time t and, if the next I frame (or the IDR frame) is a $q^{th}$ frame, to determine the $q^{th}$ frame of the $(N+1)^{th}$ video stream as the video stream corresponding to the play position information, and
   the step (d) comprises transmitting frames of one GOP to the user terminal starting with the $q^{th}$ frame of the $(N+1)^{th}$ video stream.

13. The media streaming method according to claim 12, wherein the step (b) comprises receiving a random access point, indicating a time corresponding to the play position information, from the user terminal.

14. The media streaming method according to claim 13, wherein if the play position information is a time t in the step (b), the step (c) comprises searching for a video stream having an I frame (or an IDR frame) nearest to the time t and, if the I frame (or the IDR frame) is a $P^{th}$ frame of the retrieved video stream, determining the $P^{th}$ frame of the video stream as the video stream corresponding to the play position information.

15. The media streaming method according to claim 12, wherein:
   after the step (d) of transmitting the $(N+1)^{th}$ video stream, the step (c) is performed again in order to search an $(N+2)^{th}$ video stream for a next I frame (or an IDR frame) nearest to the time t and, if the next I frame (or the IDR frame) is an $r^{th}$ frame, to determine the $r^{th}$ frame of the $(N+2)^{th}$ video stream as the video stream corresponding to the play position information, and
   the step (d) comprises transmitting frames of one GOP to the user terminal starting with the $r^{th}$ frame of the $(N+2)^{th}$ video stream.

16. A media streaming method of a user terminal communicating with a media server for storing a piece of media content in a form of a plurality of video streams over a communication network, the media streaming method comprising the steps of:
   (a) receiving the media content from the media server in a streaming form;
   (b) playing the streamed media content;
   (c) receiving play position information about a position where play is requested from a user in relation to the played media content;

(d) transmitting the received play position information to the media server;

(e) receiving a video stream, corresponding to the play position information, from the media server in a streaming form; and (f) playing video streams, starting with the video stream corresponding to the play position information;

wherein if the play position information is the time t, the control unit of the media server searches an $N^{th}$ video stream for an I frame (or an IDR frame) nearest to the time t and, if the I frame (or the IDR frame) is a $P^{th}$ frame, transmits frames to the user terminal starting with the $P^{th}$ frame of the $N^{th}$ video stream, and wherein after transmitting the $N^{th}$ video stream, the control unit of the media server searches an $(N+1)^{th}$ video stream for a next I frame (or an IDR frame) nearest to the time t and, if the next I frame (or the IDR frame) is a $q^{th}$ frame, transmits frames to the user terminal starting with the $q^{th}$ frame of the $(N+1)^{th}$ video stream.

17. The media streaming method according to claim 16, wherein if the play position information is a random access point where play is requested at a time t in the step (d), the video stream corresponding to the play position information in the step (e) is a video stream having an the I frame (or an IDR frame) nearest to the time t, and if the I frame (or the IDR frame) is a $P^{th}$ frame, the step (f) comprises playing frames starting with the $P^{th}$ frame of the video stream.

18. The media streaming method according to claim 17, wherein the video stream in which the I frame (or the IDR frame) is the $P^{th}$ frame is a video stream having a greatest stream number, from among the plurality of video streams for the piece of media content stored in the media server.

19. The media streaming method according to claim 18, wherein the video stream having the greatest stream number is a video stream having a high compression ratio owing to a long GOP cycle.

* * * * *